Z. DOOLITTLE.
Cotton-Planter.

No. 29,065.

Patented July 10, 1860.

Witnesses:

Inventor:
Zina Doolittle

UNITED STATES PATENT OFFICE.

ZINA DOOLITTLE, OF PERRY, GEORGIA.

IMPROVEMENT IN COTTON-SEED PLANTERS.

Specification forming part of Letters Patent No. 29,065, dated July 10, 1860.

*To all whom it may concern:*

Be it known that I, ZINA DOOLITTLE, of Perry, in the county of Houston and State of Georgia, have invented a new and Improved Cotton-Seed Planter; and I do hereby declare that the following is a full, clear, and exact description of the same, reference being had to the accompanying drawings, forming part of this specification, in which—

Figure 1:
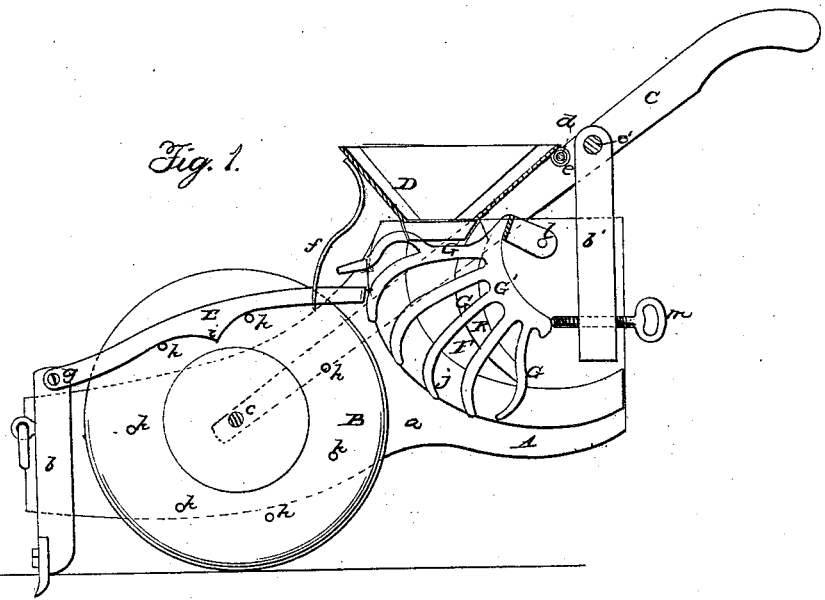
Figure 2:
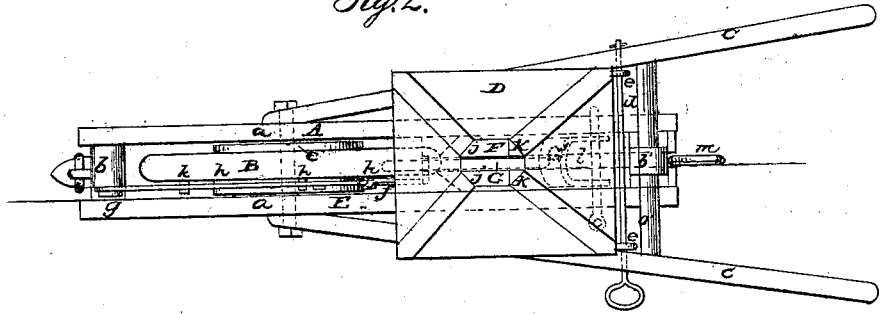

Figure 1 represents a longitudinal vertical section of my invention. Fig. 2 is a plan or top view of the same.

Similar letters of reference in both views indicate corresponding parts.

This invention consists, first, in the arrangement of a pin-wheel, in combination with a hinged oscillating hopper and with vibrating curved fingers, in such a manner that by rotating the wheel motion is imparted to the hopper and to the fingers, whereby the discharge of the seed is facilitated; second, in combining with said vibrating curved fingers a curved slotted seed passage-way, so that the fingers, by extending through the slot in said passage-way, prevent a clogging up of the seed as it discharges; third, in the arrangement of a thumb-screw, in combination with the above-mentioned oscillating curved fingers, in such a manner that the motion of the fingers, can be regulated independent from the motion of the hopper.

To enable those skilled in the art to make and use my invention, I will proceed to describe its construction and operation with reference to the drawings.

A represents the frame of my seed-planter, constructed by bolting the side pieces, $a$, to the standards $b$ $b'$. The side pieces, $a$, form the bearings for the axle $c$ of the wheel B, and the handles C are firmly secured to the outside of the side pieces, as clearly shown in Fig. 2, and they are supported by a cross-bar, $c$, passing through the upper end of the standard $b'$.

The hopper D is hinged to the handles by means of a bolt, $d$, passing through loops $e$ at the upper edge of the hopper, and an oscillating motion is imparted to the hopper by means of an arm, $f$, which is firmly secured to the front side of the hopper, and which rests on the lever E, which is fulcrated on a pin, $g$, in the upper end of the standard $b$. This lever is actuated by a series of pins, $h$, inserted in the side of the wheel B, and operating on a cam, $i$, on the under side of said lever. The oscillating motion imparted to the lever E by the action of the pins $h$ on the cam $i$ is communicated to the hopper, whereby the discharge of the seed is greatly facilitated. The corners of the hopper are filled in with flat plates, giving to the whole the appearance of an inverted hollow truncated octagonal pyramid, and my experience shows that the seed discharges much more freely from a hopper of this form than it does from a four-sided sharp-cornered hopper of the usual form. From the hopper the seed passes down through a curved passage, F, constructed of four segmental ribs, $j$ and $k$, placed on the inner side of the side pieces, $a$, and under the hopper D. The ribs $j$, as well as the ribs $k$, are placed one opposite to the other, and the inner pair of ribs, $k$, form an angle with the outer pair; $j$, as clearly shown in Fig. 1. Sufficient room is left between each pair of ribs for the curved fingers G, which are attached to a head, G', that is suspended from a pivot, $l$, passing through the side pieces, $a$. The upper one of the fingers G extends through the slot between the ribs $j$ $k$, and it is operated upon by the same lever, E, that imparts motion to the hopper D. By these means a vibrating motion is imparted to the fingers G simultaneously with the hopper D, and the clogging of the seed in the passage F is most effectually prevented. The ribs $j$ and $k$ are made wedge-shaped, and they are placed in such relation to each other and to the fingers, and the fingers are curved in such a manner that they discharge seed in moving both ways, and in both directions the curved ribs act as wedges to facilitate the discharge of the seed and to prevent it clogging. The motion of the fingers G is regulated by a thumb-screw, $m$, passing through the standard $b'$, and bearing against the head G', which carries the curved fingers G. By screwing in this screw the head is turned up and the effect of the vibrating lever E on the upper one of the curved fingers is reduced. By screwing the screw $m$ out the reverse takes place and the motion of the fingers G is increased. By these means my seed-planter can readily be adjusted for different kinds of seed, and it can be used not only for cotton-seed, but also for various other seeds. It is so constructed that it can easily be managed and readily understood.

It is light and simple, and all its parts are so arranged that they do not readily get out of repair.

Having thus fully described my invention, what I claim as new, and desire to secure by Letters Patent, is—

1. The arrangement and combination of the hinged oscillating hopper D, vibrating curved fingers G, and pin-wheel B, constructed and operating substantially in the manner and for the purpose specified.

2. The combination, with the vibrating curved fingers G, of the curved slotted seed passage-way F, constructed and operating substantially as and for the purpose set forth.

3. The arrangement of the thumb-screw m, in combination with the vibrating curved fingers G, operating substantially in the manner and for the purpose described.

ZINA DOOLITTLE.

Witnesses:
L. D. CARPENTER,
ARTHUR WATSON.